United States Patent [19]

Delise

[11] Patent Number: 4,608,794

[45] Date of Patent: Sep. 2, 1986

[54] CORNER MOULDING AND FASTENER

[75] Inventor: Fred Delise, Clearwater, Fla.

[73] Assignee: LRD, Inc, New Port Richey, Fla.

[21] Appl. No.: 792,806

[22] Filed: Oct. 30, 1985

[51] Int. Cl.[4] .......................... F16B 9/02; F16B 12/44; A47B 57/00

[52] U.S. Cl. ...................................... 52/288; 52/718.1; 403/231

[58] Field of Search ................ 52/282, 286, 288, 281, 52/716-718, 475, 476, 254-257; 403/231, 405

[56] References Cited

U.S. PATENT DOCUMENTS

| | | | |
|---|---|---|---|
| 947,617 | 1/1910 | McGann | 52/288 |
| 3,407,555 | 10/1968 | Pugh | 52/288 |
| 3,989,397 | 11/1976 | Baker | 52/288 X |
| 4,477,201 | 10/1984 | Yoshiyuji | 403/231 |

FOREIGN PATENT DOCUMENTS

| | | | |
|---|---|---|---|
| 2530453 | 1/1976 | Fed. Rep. of Germany | 403/231 |
| 2845578 | 4/1980 | Fed. Rep. of Germany | 403/231 |
| 1175346 | 11/1958 | France | 52/288 |
| 2032567 | 5/1980 | United Kingdom | 403/231 |

Primary Examiner—J. Karl Bell
Attorney, Agent, or Firm—Stein, Reese & Prescott

[57] ABSTRACT

A decorative corner moulding for fastening two furniture panels together at a corner including first and second corner mouldings nailed to the respective furniture panels, a cross-member for securing the panels together, and an insert member with a semi-circular outer flange that covers and conceals the corner moulding.

5 Claims, 3 Drawing Figures

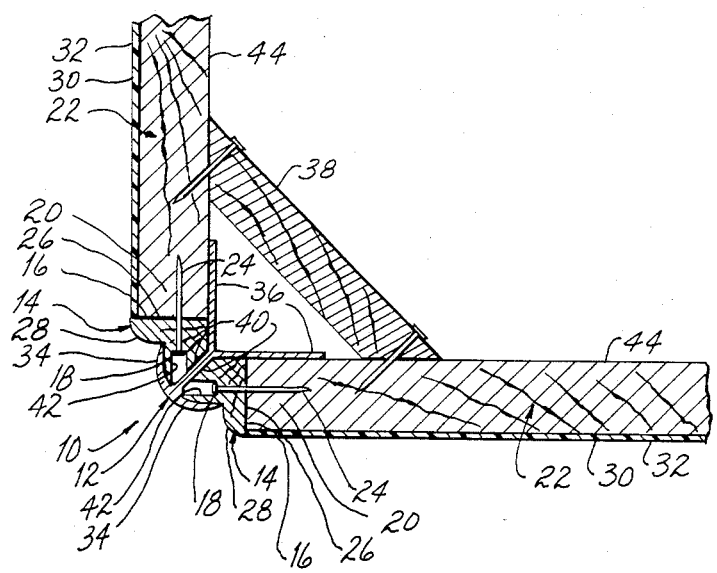

CORNER MOULDING AND FASTENER

BACKGROUND OF THE INVENTION

1. Field of the Invention

This invention relates generally to apparatuses and methods for fastening two boards perpendicularly together to form a decorative corner. More particularly, this invention relates to apparatuses and methods for forming a corner joint of two sheets of wood laminated with a plastic laminate to form a rigid and esthetically pleasing corner.

2. Description of the Background Art

Presently, there exists many apparatuses and methods for joining the edges of two sheets of wood to form a corner. Representative corner fasteners located during a patentability search are disclosed as follows. U.S. Pat. No. 4,271,971 discloses a light-weight cargo container and fitting to provide a secure connection between wall panels of a light-weight container. U.S. Pat. No. 4,261,148 discloses an apparatus for holding boards in a perpendicular arrangement with one another during the making of furniture. U.S. Pat. No. 3,783,931 discloses a device for fixing a covering sheet inside a dihedron formed by two perpendicular surfaces. U.S. Pat. No. 2,340,454 discloses a panel and corner fastener including side members adapted for attaching in a position at right angles to one another as well as embodying a construction adapted for securing panels in edge-to-edge relationship. Finally, U.S. Pat. No. 2,993,637 discloses a bolted box corner construction providing a lock-joint between a pair of corrugated sheets of material.

Each of the apparatuses and methods disclosed in the above identified patents, the disclosures of which are hereby incorporated by reference herein, work suitably well for their intended purpose. However, with regard to the construction of furniture, those apparatuses cannot provide a means for connecting furniture panels together along a corner which is particularly esthetically pleasing to the customer. Hence, those apparatuses and methods have typically been used to construct containers or wall assemblies for industrial applications. Indeed, U.S. Pat. No. 4,261,148 discloses specifically a corner connector for furniture with an outwardly angled surface (70) which provides a decorative corner only because of its flat configuration.

Therefore, it is an object of this invention to provide a method which overcomes the aforementioned inadequacies of the prior art methods and provides an improvement which is a significant contribution to the advancement of the corner moulding and fastening art.

Another object of this invention is to provide a corner moulding and fastener for fastening the edges of furniture panels together to provide a decorative corner which is esthetically pleasing to the customer.

Another object of this invention is to provide a corner moulding and fastener for connecting edges of furniture panels together to provide a smooth corner with no sharp edges or the like.

Another object of this invention is to provide a corner moulding and fastener which can be sold as a kit to finish carpenters/cabinet makers to be used to quickly and easily join edges of furniture panels together to form a decorative edging.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure contained herein and in the above identified patents, the disclosure of which is hereby incorporated by reference herein. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a decorative corner moulding and fastener particularly designed for fastening the edges of furniture panels together to provide an esthetically pleasing corner configuration. More particularly, the invention comprises a pair of decorative corner mouldings for affixing to the edges of the furniture panels and an insert member for insertion between the pair of mouldings. The perpendicular relationship of the panels is secured by means of a crosspanel diagonally fastened to the inside surfaces of the furniture panels. Preferably, the corner mouldings are composed of wood capable of being stained or painted to match the exterior surface of the furniture panel, either in its natural state or as laminated with a sheet of plastic decorative laminate. The insert member preferably comprises a semi-circular outer flange to provide a rounded inset corner at the corner formed by the furniture panels. Also, preferably, the insert member comprises a pair of inside flanges perpendicularly disposed from one another to provide added support to the perpendicular arrangement of the furniture panels.

The foregoing has outlined rather broadly the more pertinent and important features of the present invention in order that the detailed description of the invention that follows may be better understood so that the present contribution to the art can be more fully appreciated. Additional features of the invention will be described hereinaftr which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
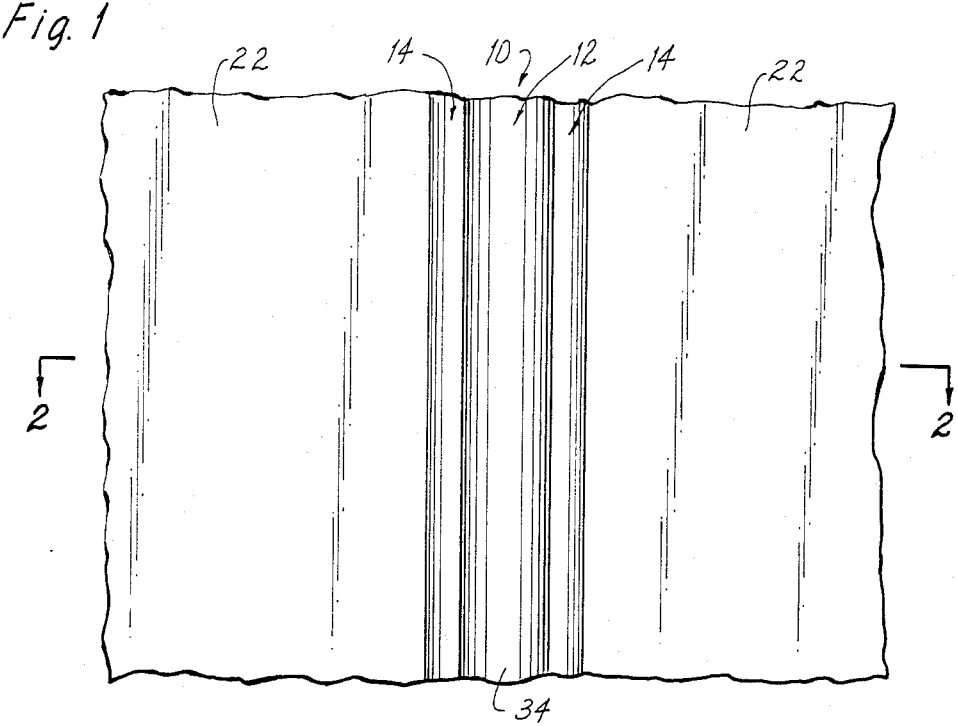
FIG. 1 is an edge view of the corner moulding and fastener of the invention adapted to perpendicularly join two furniture panels together.
Figure 2:
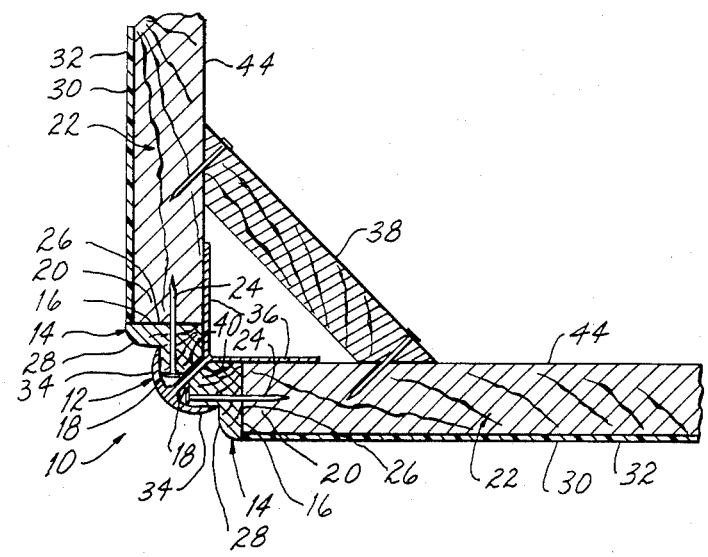
FIG. 2 is a cross-sectional view of FIG. 1 along lines 2—2 illustrating the cross-sectional configuration of the pair of corner mouldings, the insert member, and the cross-member of the invention; and, FIG. 3 is another cross-sectional view illustrating an alternative embodiment of the pair of corner mouldings.

Referring to FIGS. 1 and 2, the corner moulding and fastener 10 of the invention comprises an insert member 12 positioned between a pair of specially configured mouldings 14. The mouldings 14 each comprise flat bottom surface 16 for mating with the edge 20 of a furniture panel 22. Each moulding 14 further includes a flat top surface 18 allowing a nail 24 or other fastener to be driven into the flat top surface 18, through the moulding 14 and into the edge 20 of the furniture panel 22 to rigidly secure the moulding 14 to the edge 20 of the furniture panel 22. In combination with nail 24, conventional wood glue 26 may be applied to the mating surfaces between the bottom surface 16 of moulding 14 and the edge 20 of the furniture panel 22 to thereby more rigidly fasten the moulding 14 to the edge 20 of the furniture panel 22.

Each moulding 14 comprises a contoured groove 28 extending from the outside edge of its bottom surface 16 into the moulding 14 by a distance approximately equal to one-third of the width of the moulding 14. Contoured groove 28 is rounded as shown in the drawings to provide a rounded design which is esthetically pleasing to the purchaser of the furniture composed of the furniture panels 22. The mouldings 14 are preferably composed of wood capable of being stained or painted of a desired color to esthetically match the outside surface 30 of the furniture panel 22. Moreover, in the event that the furniture panels 22 are laminated with a sheet of plastic laminate 32, the contoured groove 28 of the mouldings 14 may be stained or painted with a different color to complement the color or design of the laminate 32 and provide a contemporary look.

The insert member 12 is positioned diagonally, at a forty-five degree angle, relative to the bottom surface 16 and top surface 18 of the mouldings 14. The insert member 12 further includes a semi-circular outer flange 34. The semi-circular outer flange 34 of the insert member 12 is dimensioned to fit exteriorly over the outer surface of moulding 14 from the point of termination of the contoured groove 28 to conceal the remaining portion of the moulding 14 including its top surface 18 and nails 24. The insert member 12 still further includes a pair of flat inside flanges 36 extending along its length. The inside flanges 36 are perpendicularly disposed relative to one another to provide support to the perpendicularly disposed furniture panels 22.

Finally, the corner moulding and fastener 10 of the invention further comprises a cross-member 38 configured to be fastened to the inside surface 44 of the furniture panels 22 and provide additional support to maintain their perpendicular position relative to one another. However, it is noted that many other alternative types of cross-members 38 may be utilized in conjunction with the insert member 12 and corner mouldings 14 of the invention without departing from the spirit and scope of this invention.

During construction, the carpenter/cabinet maker obtains two sections of furniture panels 22 desired to be fitted perpendicularly together to form a corner. The carpenter/cabinet maker stains or paints the corner moulding 14 with a desired color to match the color of the laminate 32 on the exterior surface 30 of the furniture panel 22 to provide a contemporary look. Adhesive 26 is applied to the edge 20 of the furniture panels 22 and to the bottom surface 16 of the corner mouldings 14. Nails 24 are then used to pierce the top surface 18 of the corner moulding 14 and fasten the corner moulding 14 to the edges 20 of the furniture panels 22. In this regard, it is noted that top surface 18 includes a flat configuration allowing the nail 24 to be driven through the body of the moulding 14 without veering off or splitting the moulding 14. Indeed, previous experiments on the invention provided that a non-flat top surface 18 caused the nailing of the nail 24 to veer from the edge 20 of the furniture panel 22 and split the moulding 14.

After the corner mouldings 14 are fastened to the edge 20 of the panels 22, insert member 12 is positioned between the corner mouldings 14 and the top surface 18 of the moulding 14 is forced inwardly into the insert member 12 between the semi-circular outer flange 34 and the perpendicularly disposed inside flanges 36. It is noted that the inner side portion 40 of the top surface 18 may be angularly disposed to mate against the angular disposition of the insert member 12 while still providing a sufficiently wide flat top surface 18 for driving the nail 24 through the moulding 14 into the panel 22. Moreover, referring to FIG. 3, the top surface 18 of the corner moulding 14 may additionally include an outer side portion 42 which, together with inner side portion 40, extends upwardly from top surface 18 to even more uniformly mate with the interior surfaces of the insert member 12.

After the insert member 12 is positioned between the mouldings 14 and the panels 22, secured in a right angle, perpendicular position relative to one another, cross-member 38 is affixed to the inside surface 44 of the furniture panel 22 in a diagonal relationship illustrated and secured thereto by nails 46 or the like.

Referring to FIG. 1 again, the completed structure of the invention provides a smooth, contemporary look with wooden corner mouldings 14 accenting the laminate 32 on the furniture panels 22. The semi-circular outer flange 34 of the insert member 12 is inset into the corner because of the positioning of the contoured groove 28 thereby assuring a smooth, rounded corner which does not protrude beyond the corner line which would have otherwise been formed with conventional techniques. With the top surface 18 including the upward extending inner and outer side portions 40 and 42 as illustrated in FIG. 3, it is apparent that the semi-circular outer flange 34 is fully supported inwardly thereby precluding the possibility of dents or other deformations being made in the semi-circular outer flange 34 when inadvertently hit with chairs or other pieces of furniture.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A decorative corner moulding and fastener for fastening two furniture panels together in a perpendicular arrangement to form a corner, comprising in combination:
- a first and a second corner moulding, each said corner moulding comprising a flat bottom surface, a flat top surface, and a contoured groove;
- nail means for affixing said corner mouldings to the respective furniture panels;
- an insert member, said insert member including a semi-circular outer flange and a perpendicularly disposed inside flange coinciding with the perpendicularity of the furniture panels; and
- cross-member means for rigidly securing the furniture panels in a perpendicular arrangement with one another,
- whereby said semi-circular outer flange is positioned over all portions of said corner mouldings except for said contoured grooves thereof to conceal said corner moulding while leaving exposed said contoured grooves.

2. The corner moulding and fastener as set forth in claim 1, further including wood adhesive positioned between said bottom surface of said corner moulding and the edge of the furniture panels to more rigidly secure said corner mouldings to the respective edges of said furniture panels.

3. The corner moulding and fastener as set forth in claim 2, wherein said top surface of said corner mouldings each comprises upwardly extending inner and outer side portions conforming to the interior configuration of said insert moulding between said semi-circular outer flange and said inside perpendicular edges.

4. The corner moulding and fastener as set forth in claim 3, wherein said corner mouldings are stained with a color.

5. The corner moulding and fastener as set forth in claim 3, wherein said corner mouldings are painted with a desired color.

* * * * *